(12) United States Patent
Malina (10) Patent No.: US 10,609,338 B1
(45) Date of Patent: Mar. 31, 2020

(54) SURVEILLANCE SYSTEMS AND METHODS THEREOF (71) Applicant: Western Digital Technologies, Inc., Irvine, CA (US)

(72) Inventor: James N. Malina, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 340 days.

(21) Appl. No.: 15/256,397

(22) Filed: Sep. 2, 2016

(51) Int. Cl.
| | |
|---|---|
| G06F 7/00 | (2006.01) |
| H04N 7/18 | (2006.01) |
| H04L 29/08 | (2006.01) |
| G06K 9/00 | (2006.01) |
| H04N 5/232 | (2006.01) |

(52) U.S. Cl.
CPC ......... *H04N 7/181* (2013.01); *G06K 9/00228* (2013.01); *G06K 9/00771* (2013.01); *H04L 67/12* (2013.01); *H04N 5/23206* (2013.01)

(58) Field of Classification Search
CPC ............... H04N 7/181; G06K 9/00228; G06K 9/00771; H04L 67/12; H04L 5/23206
USPC ........................................................ 348/159
See application file for complete search history.

(56) References Cited

U.S. PATENT DOCUMENTS

| | | | |
|---|---|---|---|
| 6,757,684 B2 | 6/2004 | Svendsen et al. | |
| 9,060,116 B2 | 6/2015 | Kim | |
| 2003/0063770 A1* | 4/2003 | Svendsen ........... | G06K 9/00677 382/100 |
| 2009/0055204 A1* | 2/2009 | Pennington ............. | G07F 17/32 463/29 |
| 2009/0055205 A1 | 2/2009 | Nguyen et al. | |
| 2012/0169882 A1* | 7/2012 | Millar ..................... | H04N 7/181 348/159 |
| 2012/0300081 A1* | 11/2012 | Kim .................. | G08B 13/19656 348/159 |
| 2013/0166711 A1* | 6/2013 | Wang ..................... | H04N 7/181 709/223 |
| 2016/0105645 A1* | 4/2016 | Yamazaki .............. | H04N 7/181 348/159 |

* cited by examiner

*Primary Examiner* — Nguyen T Truong
(74) *Attorney, Agent, or Firm* — Barry IP Law, P.C.

(57) ABSTRACT

Operation of a data collection node in a network of data collection nodes includes acquiring data using at least one sensing device of the data collection node. The acquired data is stored in a memory of the data collection node and metadata is generated at the data collection node based on the acquired data. The metadata is analyzed at the data collection node and at least one of the metadata, the acquired data, and an alert is sent from the data collection node to another device on the network based on the analysis of the metadata.

35 Claims, 10 Drawing Sheets

DCN Chat Initiation

FIG. 8A

DCN Chat Request

SURVEILLANCE SYSTEMS AND METHODS THEREOF

BACKGROUND

Large scale surveillance systems, such as a city-wide surveillance system, are becoming more important in light of terrorist attacks such as the Boston Marathon Bombing. In the case of the Boston Marathon Bombing, video from many different cameras was analyzed to help identify the suspects. Analyzing large data sets collected across a surveillance system can create a significant data infrastructure burden. The ability to efficiently and quickly analyze data collected from a large number of devices, such as video cameras, can help law enforcement apprehend a suspect or even prevent an attack or other crime.

Conventional surveillance systems that are distributed across a large geographical area, such as a city or an airport, can require time to access and identify potentially relevant data collected from different locations. In systems where data is collected at a central location, the amount of data that needs to be sent and analyzed at the central location can make analysis of the data cumbersome and time consuming.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Example Systems

Figure 1:
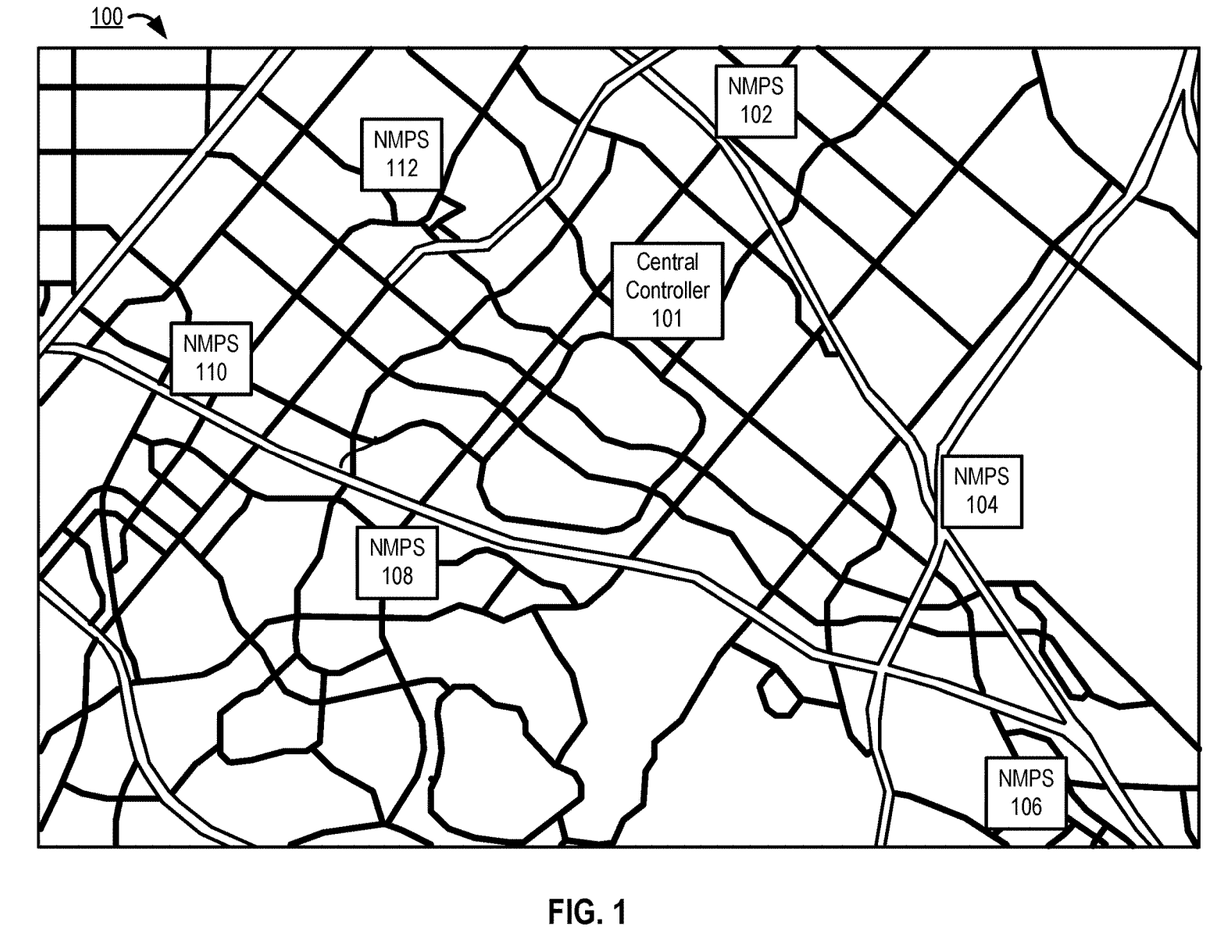
FIG. 1 illustrates an example surveillance system distributed across a geographical area according to an embodiment.

FIG. 1 illustrates an example surveillance system 100 distributed across a geographic area according to an embodiment. As shown in FIG. 1, surveillance system 100 includes central controller 101 and Network Metadata Processing Servers (NMPS) 102, 104, 106, and 108 in different geographic locations that store metadata generated by groups of Data Collection Nodes (DCNs) (e.g., the group of DCNs 114, 116, 118, 120, 122, 124, and 126 in FIG. 2). The metadata stored at the NMPS can be accessed by central controller 101.

Central controller 101, the NMPS, and the DCNs can communicate with each other via a network (not shown). The network may be through the internet or a Wide Area Network (WAN) and may include wired and/or wireless connections. In other implementations, the components of FIGS. 1 and 2 may communicate through a Local Area Network (LAN) to connect DCNs in a building or nearby buildings, such as on a campus.

As discussed in more detail below, data acquired by the DCNs is used to generate the metadata stored in the NMPS. This ordinarily allows for distributed analysis and processing of the data acquired at the DCNs, thereby relieving the processing load required at central controller 101. The arrangement of surveillance system 100 also reduces the amount of data that needs to be transmitted to a central location, such as central controller 101. As discussed in more detail below, the generated metadata stored at the NMPS also allows for potentially relevant data indicating an object or event to be more quickly identified across surveillance system 100 by analyzing the metadata at the NMPS or at the DCN. As used throughout the present disclosure, an object can include a living object such as a person.

In other embodiments, surveillance system 100 may not include NMPS 102, 104, 106, and 108, such that central controller 101 accesses the generated metadata directly from the DCNs. As will be appreciated by those of ordinary skill in the art, the number and locations of the NMPS, the central controller, and the DCNs can vary to meet the needs of surveillance system 100. For example, other embodiments may locate some or all of NMPS 102 to 122 closer to central controller 101, such as in the same building as central controller 101.

Figure 2:
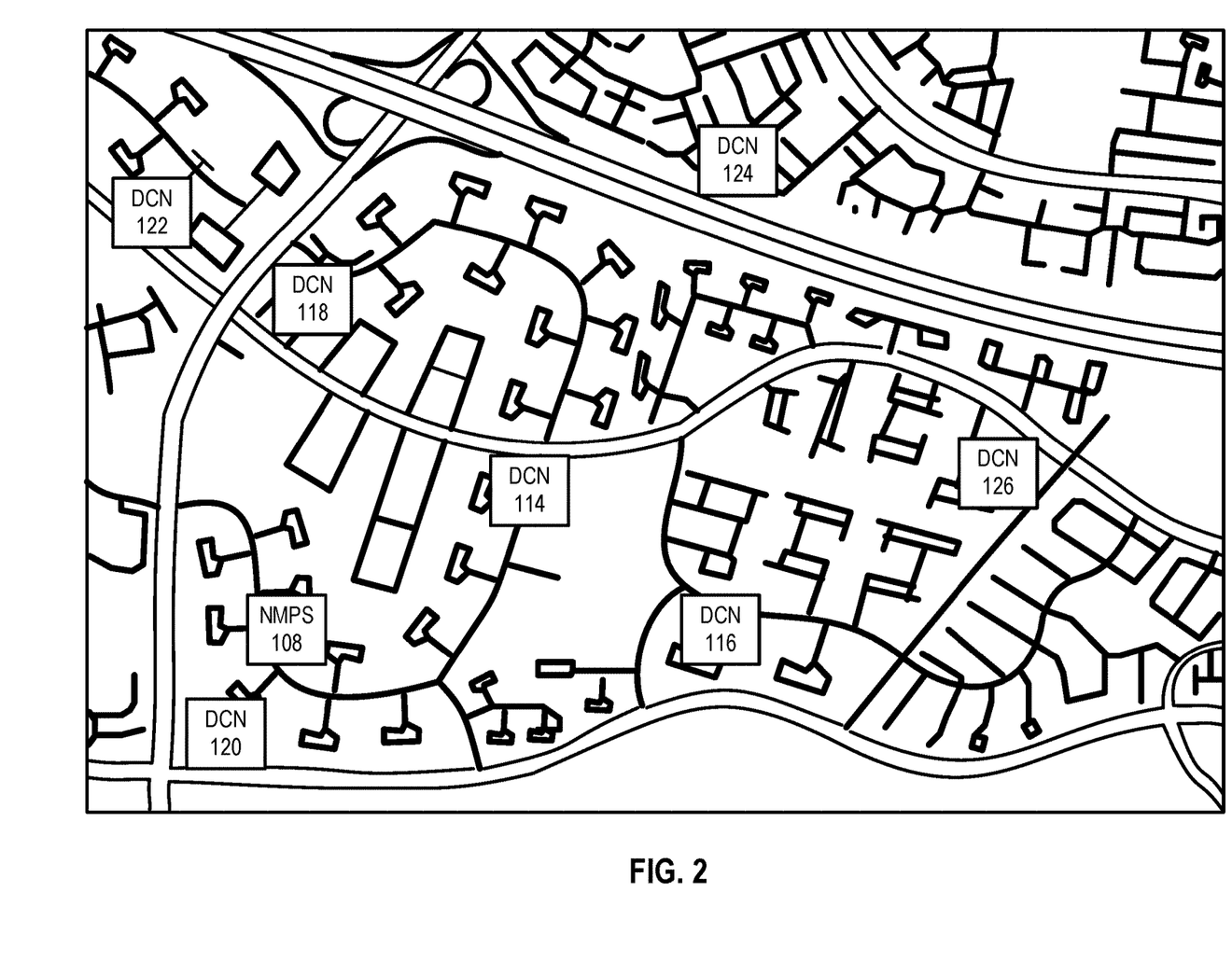
FIG. 2 depicts a closer view of a portion of the surveillance system of FIG. 1 according to an embodiment.

FIG. 2 depicts a closer view of a portion of surveillance system 100 surrounding NMPS 108 according to an embodiment. In the example of FIG. 2, the group of DCNs 114, 116, 118, 120, 122, 124, and 126 send metadata generated at the DCNs to NMPS 108. The DCNs also store data acquired by at least one sensing device of the DCN.

In some implementations, the DCNs can include video cameras that acquire video data that is stored locally in a memory of the DCN. Examples of other types of sensing devices of a DCN can include a microphone to acquire audio data, an infrared detector to acquire heat data, a still camera to acquire photographic data, a vibration sensor to acquire vibration data, a radiation sensor to acquire radiation data, a proximity sensor to acquire proximity data, point of sale data to acquire purchasing data (e.g., credit card information or items purchased), a Light Detection And Ranging (LiDAR) speed detector to acquire velocity data; a GPS sensor to acquire position data, a terahertz sensor to acquire terahertz image data, or an x-ray sensor to acquire x-ray image data. Other types of sensing devices could also be included in a DCN.

NMPS 108 receives metadata from DCNs 114, 116, 118, 120, 122, 124, and 126. This metadata can represent an initial analysis of the data acquired at the DCNs. The metadata received by NMPS 108 is stored in a memory of NMPS 108.

In the example of FIG. 2, the data acquired by the DCNs is also stored locally at the DCN. By storing the acquired data locally at the DCN, it is ordinarily possible to take advantage of the collectively larger memory and processing resources of the DCNs distributed throughout the surveillance system 100 than at a central office. In some implementations, the metadata generated from the acquired data by the DCN may also be stored volatilely or non-volatilely at the DCN.

Generating and analyzing the metadata at the DCNs rather than at central controller 101, can generally provide for more efficient processing of the acquired data at the DCNs in real time as the data is being acquired. In addition, storing and analyzing or processing the generated metadata at an NMPS for a group of DCNs can provide for quicker and more efficient searching of the metadata than having to send all of the metadata across surveillance system 100 to central controller 101 and then analyze or process all of the metadata at central controller 101. This can allow the NMPS or central controller 101 to identify data of interest across a wide geographic area. In this way, only the potentially relevant data may be sent to central controller 101, thereby saving bandwidth in the network and conserving processing and memory resources at central controller 101.

Figure 3:
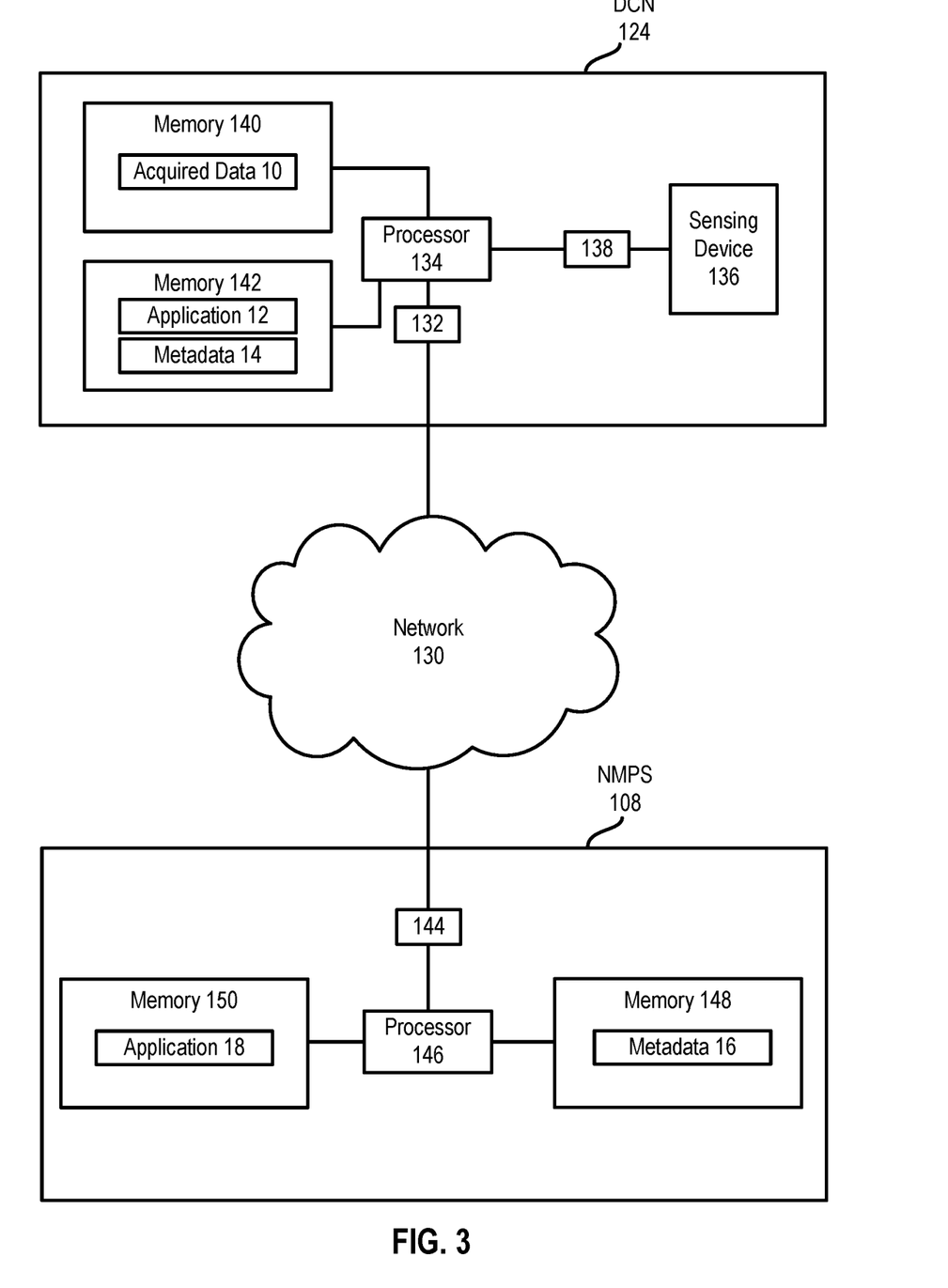
FIG. 3 is a block diagram of a Data Collection Node (DCN) and a Network Metadata Processing Server (NMPS) according to an embodiment.

FIG. 3 is a block diagram providing examples of DCN 124 and NMPS 108 according to an embodiment. As shown in FIG. 3, DCN 124 and NMPS 108 are connected through network 130, which can include, for example, a LAN, WAN, or the internet.

As will be appreciated by those of ordinary skill in the art, the number and location of components shown in FIG. 3 can differ in other implementations. For example, other DCNs may include multiple sensing devices at one location or at different locations with the memory and processor of the DCN at another location. One such example can include multiple sensing devices at different locations (e.g., different rooms in a building) that send data to a central processor and memory of the DCN. In other implementations, the components of the DCN may be combined into a single device such as a video camera with a memory and/or a processor for the DCN.

In the example of FIG. 3, DCN 124 includes sensing device 136, device interface 138, processor 134, network interface 132, memory 142, and memory 140. Sensing device 136 can include, for example, a video camera, a microphone, an infrared detector, a radiation sensor, a still camera, a vibration sensor, a proximity sensor (e.g., an inductive sensor), a terahertz sensor, an x-ray sensor, a point of sale device, a LiDAR detector, or a GPS sensor. In the case of a GPS sensor, the DCN may be located on a moving object, such as a drone. Other types of sensing devices could also be used for sensing device 136. The data acquired by sensing device 136 is received by processor 134 via device interface 138 and stored as acquired data 10 in memory 140.

Memory 140 storing acquired data 10 can include a non-volatile memory that is eventually overwritten with new data once memory 140 is full. Memory 142 can include a volatile or a non-volatile memory that stores application 12 for controlling operation of DCN 124. Application 12 can include computer-executable instructions that are loaded into memory 142 for execution by processor 134. Metadata 14 can also be stored in memory 142 before it is sent to NMPS 108 via network 130. In other implementations, DCN 124 may store acquired data 10 and metadata 14 together in the same memory.

Processor 134 can include, for example, circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, processor 134 can include a System on a Chip (SoC). The circuitry and computational capabilities of processor 134 can vary depending on the anticipated needs in generating and analyzing metadata 14 at DCN 124.

In processing the acquired data, processor 134 generates and analyzes metadata 14, which is stored in memory 142. Examples of metadata 14 can include metadata indicating at least one of a time when the data was acquired and a location of DCN 124. Another example of metadata 14 can include an electromagnetic characteristic of an object represented in the acquired data. The electromagnetic characteristic can include a color of an object. In one example, processor 134 may preprocess an image by partitioning the image (e.g., into hundredths). An image with a resolution of 1080p could include approximately 2 million pixels, and each pixel encoded with eight bits for Red, Green, and Blue (RGB). Processor 134 can segment the image into 200 pixel elements and calculate an RGB value for each 200 pixel element to represent a color of each element.

In another example, the electromagnetic characteristic can include a level of IR radiation or other type of radiation. For example, a high level of IR radiation can indicate an explosion, fire, or gunshot. In another example, a high level of radiation may indicate a radioactive substance used in a dirty bomb.

Another example of metadata 14 can include an indication of a shape and size of an object represented in the acquired data. This metadata may be used, for example, to identify a particular vehicle, person, or other object of interest in the acquired data. In one implementation, processor 134 may preprocess an image for shapes and sizes by initializing vertical and horizontal spatial counters and using RGB pixel values to compare a current RGB pixel value to an adjacent RGB pixel value. If the values match within a tolerance, an object represented in the data continues into the next pixel area and the appropriate spatial counter can be incremented. If the values do not match within a tolerance, an edge of an object represented in the data has been detected and a count value of the appropriate spatial counter can be logged.

The generated metadata can indicate a facial geometry for facial recognition. In such an example, processor 134 may calculate facial geometries such as a distance between eyes, eye to chin, nose length, or other facial geometries. These facial geometries can be compared with metadata from other DCNs or with known databases to identify a suspect. For example, a suspect may have been identified in one location and central controller 101 may request all of the NMPS in surveillance system 100 to search for metadata indicating a particular facial geometry of the suspect at different DCN locations.

In some implementations, processor 134 may generate metadata indicating an alphanumeric character or a pattern of characters represented in the acquired data, such as a license plate, writing on clothing, or an identification card. Processor 134 may use a lookup table stored in memory 140 or 142 to compare shapes detected in an image to known alphanumeric characters stored in the lookup table.

As discussed in more detail below with reference to FIG. 4, the DCN may include a projector and at least one camera as a sensing device to use structured lighting to acquire the data. Processor 134 can then generate metadata from this data to provide information on the shape and size of an object represented in the acquired data. In the case of structured lighting or other implementations using multiple cameras as sensing devices without a projector, the generated metadata may be used to render a three dimensional image.

In cases where sensing device 136 includes an infrared sensor, processor 134 may use the acquired data to determine whether an infrared heat level meets or exceeds a threshold level. The threshold level may be an absolute threshold or may be set as a number of standard deviations above a steady state value. An infrared heat level at or above the threshold level may indicate, for example, a fire, explosion, gunshot, or presence of a person. The metadata 14 generated by processor 134 may indicate whether the infrared heat level met or exceeded the threshold level and may also indicate the time when the data was acquired.

In cases where sensing device 136 includes a camera, processor 134 may use the acquired data to determine whether a brightness level of the image data changes by at least a threshold level within a predetermined period of time (e.g., 1 second). The threshold level may be an absolute value or may be set as a number of standard deviations above a steady state value to detect an image anomaly such as a dramatic brightness shift within the predetermined period of time. A change in the brightness level at or above the threshold level may indicate a fire or a flash such as from an explosion or gunshot.

In cases where sensing device 136 is a video camera, processor 134 may sample the video data at a lower frame rate (e.g., once per second) and store the sampled data as metadata 14 in memory 142. This metadata can then provide a lower resolution copy of the acquired data that can be stored at an NMPS to conserve storage space and network bandwidth since the size of the metadata will be less than the size of the acquired video data.

In addition, when sensing device 136 includes a video camera or a still camera, processor 134 can detect the motion of an object or objects represented in the acquired data and generate metadata indicating at least one of a velocity, acceleration, and direction of the object or objects. This can be accomplished by comparing frames of the acquired data at different times for changes in position of objects represented in the acquired data. This metadata may be useful, for example, in providing information on the direction of people running or flying shrapnel indicating a location of a bomb or a location of a suspect or vehicle.

In one example, processor 134 may identify an object in a video frame and check if the object is in a previous or next frame. Some tolerance may be allowed (e.g., within a predetermined percentage) for object size or color in determining whether the same object is in the previous or next frame. A depth of field for the camera could be used to determine a distance traveled by the object from one frame to the next. This distance could be divided by a time between frames to provide metadata indicating a velocity of the object, and divided by the time again to provide an acceleration of the object. Other algorithms could be used to determine a distance traveled by the object, such as an image shift approach or multiple cameras.

DCN 124 communicates with NMPS 108 in FIG. 3 via network 130, which may include a WAN or the internet with wired and/or wireless connections. In other implementations, DCN 124 and NMPS 108 may communicate through a LAN in a building or in nearby buildings, such as on a campus.

In the example of FIG. 3, NMPS 108 includes network interface 144, processor 146, memory 148, and memory 150. NMPS 108 receives metadata 14 from DCN 124 via network 130 and stores the metadata as metadata 16 in memory 148. NMPS 108 may also send metadata 16 or other metadata or data acquired from a DCN to another device on network 130, such as a central controller or another NMPS. In some implementations, processor 146 may add its own metadata to the metadata received from DCN 124 (i.e., metadata 14), such as an identifier for DCN 124, before storing metadata 16.

Processor 146 can include, for example, circuitry such as one or more processors for executing instructions and can include a microcontroller, a DSP, an ASIC, an FPGA, hard-wired logic, analog circuitry and/or a combination thereof. In one implementation, processor 146 can include an SoC. The circuitry and computational capabilities of processor 146 can vary depending on the anticipated needs in analyzing metadata 16 at NMPS 108.

Memory 148 can include a non-volatile memory that can be overwritten when memory 148 becomes full. Memory 150 can include a volatile memory for loading application 18, which includes computer-executable instructions for operating NMPS 108. In other implementations, memory 150 can include a non-volatile memory or memories 148 and 150 can be combined as one non-volatile memory.

Figure 4:
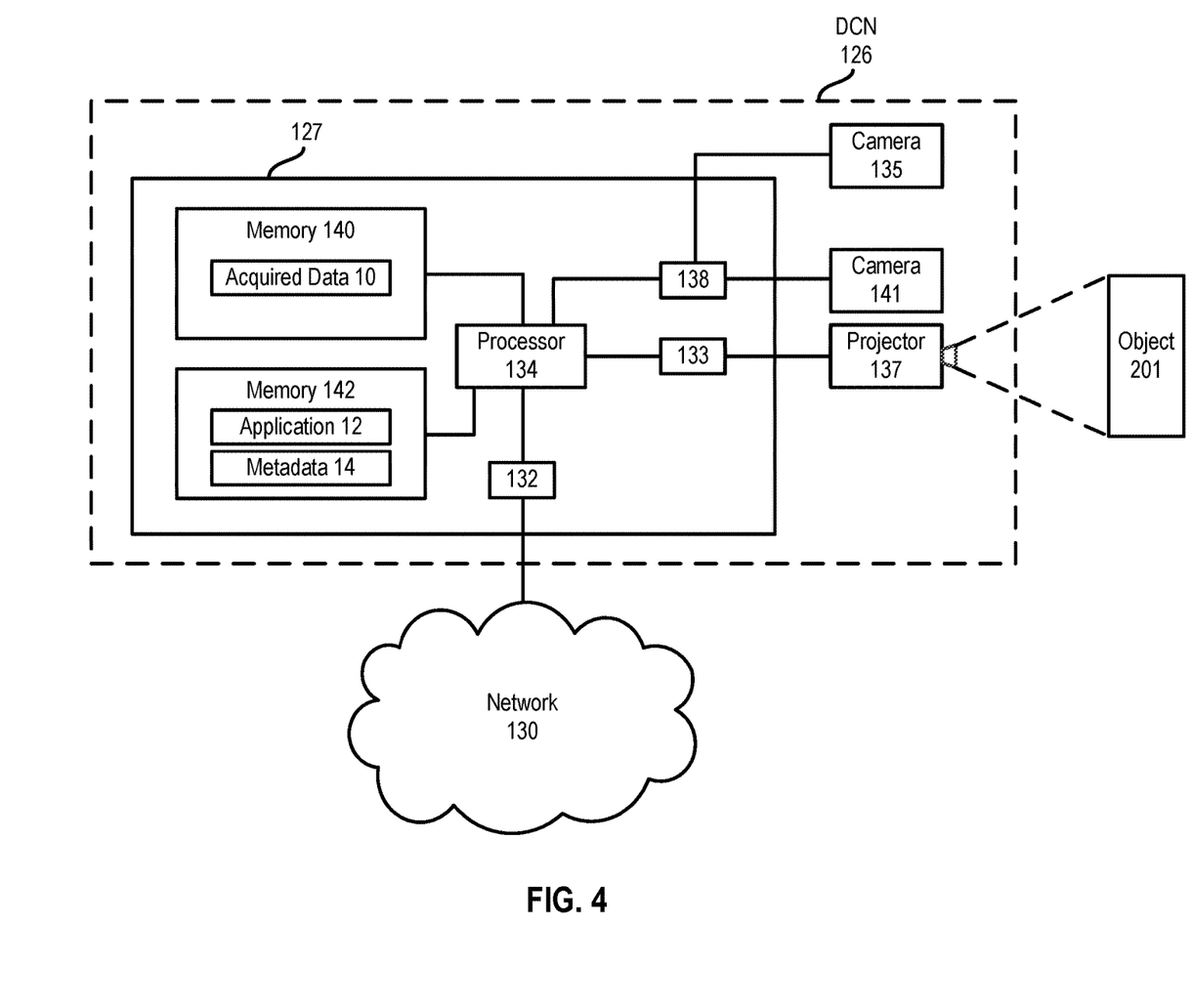
FIG. 4 is a block diagram of a DCN including a projector according to an embodiment.

FIG. 4 is a block diagram of an example DCN 126 including projector 137 and cameras 135 and 141 as sensing devices according to an embodiment. Each of cameras 135 and 141 can include a still camera or a video camera. In other implementations, DCN 126 may include projector 137 and only a single camera to acquire data of an image projected on object 201 by projector 137. In yet other implementations, DCN 126 may not include projector 137 and cameras 135 and 141 can be separated by a known distance to allow processor 134 to determine a geometric characteristic of object 201.

As with DCN 124 of FIG. 3, DCN 126 includes processor 134, device interface 138, memory 140 storing acquired data 10, and memory 142 storing application 12 and metadata 14. DCN 126 communicates with other devices on network 130, such as central controller 101, other DCNs, or one or more NMPS, via network interface 132.

Unlike FIG. 3, DCN 126 in FIG. 4 includes projector 137 which is controlled by processor 134 via projector interface 133. Projector 137 may project a known image or images on object 201, such as a grid or bars, while cameras 135 and 141 record the image or images projected on object 201. This may include using structured lighting or other techniques to render a three dimensional image of object 201. Processor 134 uses the data acquired by the cameras to identify the projected image or images and compare the projected image or images to the known image or images. Deformation of the projected image or images on object 201 can then provide information on the depth of object 201 or other geometric characteristics of object 201. In some implementations, projector 137 may project visible light rapidly so that it is not detectable to the human eye or may project infrared light.

The data representing the projected image can be used by processor 134 to generate metadata 14 indicating a geometric characteristic or dimension of object 201. In other examples, the acquired data 10 is stored for later processing as needed to later determine a geometric characteristic of object 201.

Example DCN Processes

Figure 5:
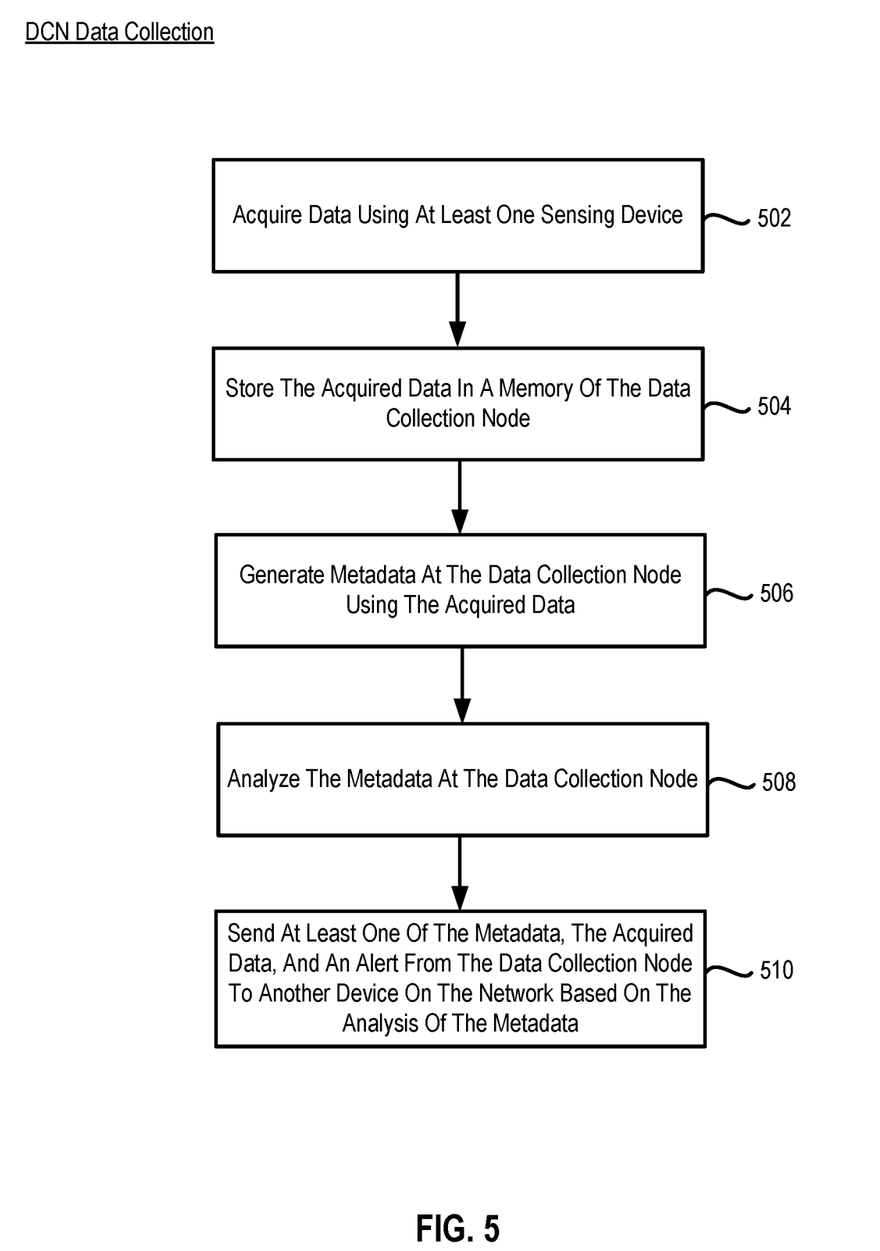
FIG. 5 is a flowchart for a data collection process of a DCN according to an embodiment.

FIG. 5 is a flowchart for an example data collection process that can be performed by a DCN in surveillance system 100 according to an embodiment. In block 502, the DCN acquires data using at least one sensing device, such as sensing device 136 in FIG. 3 or cameras 135 and 141 in FIG. 4. As noted above, the acquired data can include, for example, video data, audio data, infrared data, photographic data, vibration data, radiation data, proximity data, velocity data, terahertz image data, x-ray image data, purchasing data, or position data.

In block 504, the DCN stores the acquired data in a memory of the DCN. The memory can include volatile or non-volatile storage. In some implementations, the oldest acquired data can be overwritten when the memory reaches its storage capacity. As discussed in more detail below, the acquired data may later be sent by the DCN to another device on the network such as central controller 101 or an NMPS in response to a data request.

In block 506, the DCN generates metadata using the acquired data. As discussed above, the metadata generated in block 506 can include, for example, metadata indicating an electromagnetic characteristic of an object, at least one of a shape and size of an object, alphanumeric characters, facial geometry, an infrared heat level, a change in brightness level, a velocity, acceleration, or direction of an object, a time when the data was acquired, a location, or video data at a lower frame rate.

In block 508, the DCN analyzes the metadata generated in block 506. The analysis in block 508 can, for example, include comparing the metadata to a search criterion or an alert criterion. As discussed in more detail below with reference to the example processes of FIGS. 6, 7, 8B, and 9, the analysis of the metadata can include, for example, determining whether the metadata meets or exceeds an alert criterion, identifying an indication of an object or an event indicated by the metadata, or searching for acquired data or metadata requested by another device on the network using the metadata.

In block 510, the DCN sends at least one of the metadata, the acquired data, and an alert to another device on the network based on the analysis performed in block 508. The other device on the network can include, for example, an NMPS or central controller 101. In some implementations, the metadata can be stored at both the DCN that generated the metadata and at a remote device such as an NMPS or central controller 101. In other implementations, the metadata generated at the DCN is not permanently stored at the DCN and is sent to the other device for non-volatile storage.

Sending the generated metadata to an NMPS or central controller 101 can ordinarily lessen network traffic as compared to conventional systems that send the acquired data to a central location since the generated metadata typically has a smaller size than the acquired data. In addition, distributing the processing and storage of the acquired data at the DCNs throughout surveillance system 100 can allow for more efficient processing. In more detail, sending metadata to an NMPS or central controller can allow for data of interest to be quickly identified in a large surveillance system since only the metadata may need to be initially searched.

Figure 6:
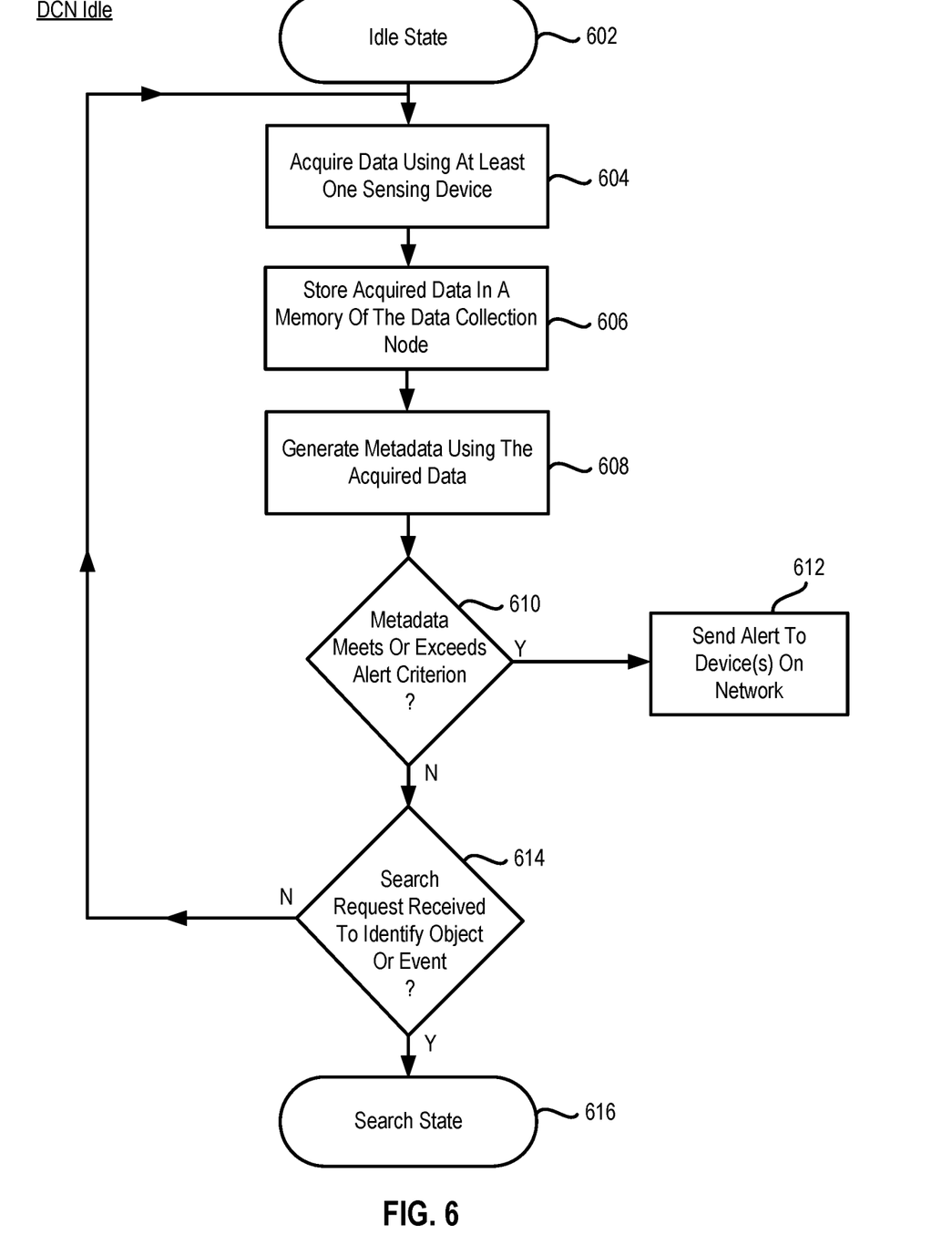
FIG. 6 is a flowchart for an idle process of a DCN according to an embodiment.

FIG. 6 is a flowchart for an example idle process of a DCN according to an embodiment. In block 602, the DCN is in an idle state where it is acquiring data and generating metadata using the acquired data. The idle state can serve as a default state when the DCN is not set to another state such as a search state, chat state, or alert state.

In block 604, the DCN acquires data using at least one sensing device. The acquired data is stored in a memory of the DCN in block 606 for possible later retrieval of the data by analysis of the metadata. In this regard, and as discussed in more detail below with reference to FIGS. 7, 8B, and 9, another device on the network may request data stored locally at the DCN or may request the DCN to search the data in its memory for certain data by analyzing the metadata generated by the acquired data. This example can be useful to identify an event or object of interest in the acquired data stored at the DCNs across surveillance system 100. In other implementations, another device on the network may change the metadata being generated at the DCN to identify a particular event or object of interest in analyzing the data at the DCN as the data is acquired.

In block 608, the DCN generates metadata using the acquired data. As discussed above, the generated metadata can be stored in a volatile or non-volatile memory of the DCN.

In block 610, the DCN analyzes the metadata by determining whether the generated metadata meets or exceeds an alert criterion. The DCN may have one or more alert criteria when analyzing the metadata in block 610. For example, an alert criterion can include a threshold being met or exceeded such as a brightness change threshold, a vibration threshold, a heat threshold, a radiation threshold, a velocity threshold, or an acceleration threshold. Other alert criteria can include, for example, a particular alphanumeric pattern, an object color, an object shape or size, or a matching facial geometry. In one example, an alert may be set at the DCN if the metadata indicates an object shape or size of a gun or other weapon, which may have been detected under clothing or in a suitcase using terahertz imaging.

If an alert criterion is met in block 610, the DCN in block 612 sends an alert to one or more devices on the network, such as to central controller 101, an LAMPS, or another DCN. The DCN may send the alert system-wide to all devices on the network or may send the alert to devices in a particular area. By analyzing the metadata at the DCN, it is ordinarily possible to analyze the acquired data in real time as the data is being acquired. This can allow surveillance system 100 to more quickly and efficiently identify an object or an event of interest.

The alert sent from the DCN in block 612 may, for example, cause the other device or devices to change a search criteria, request acquired data from one or more DCNs, or search metadata and/or acquired data for related events and objects. In one implementation, the DCN in block 612 may also begin streaming its acquired data to another device such as central controller 101.

If an alert criterion is not met in block 610, the DCN in block 614 determines whether a search request has been received to identify an object or event. If not, the idle process returns to block 604 to continue to acquire data. If a search request has been received in block 614, the DCN enters a search state in block 616.

Figure 7:
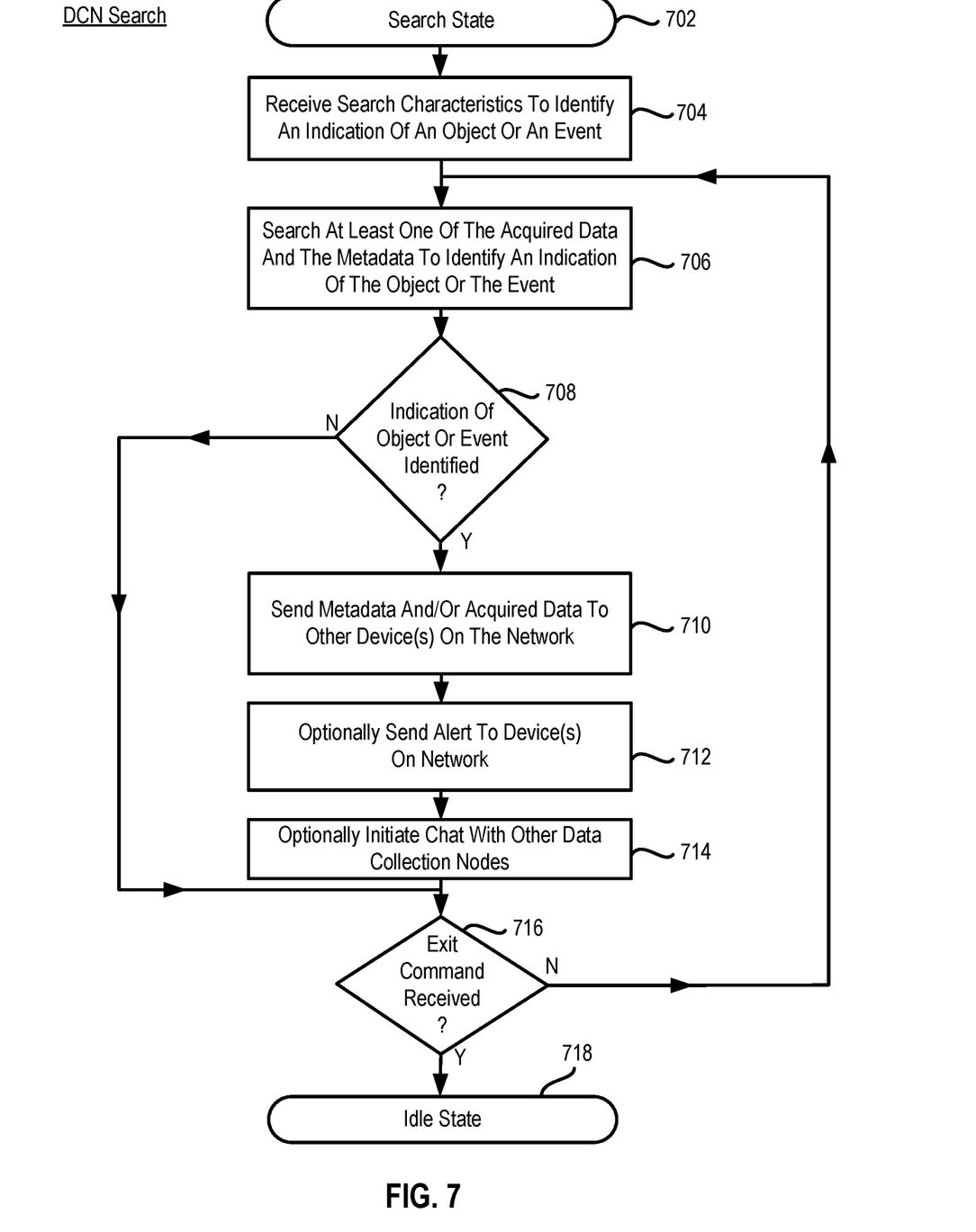
FIG. 7 is a flowchart for a search process of a DCN according to an embodiment.

FIG. 7 is a flowchart for an example search process that can be performed by a DCN according to an embodiment. In block 702, the DCN is in a search state, which may be in response to receiving one or more search requests as in block 612 of FIG. 6. In other implementations, the DCN may be in a search state as its default state without receiving a search request. For example, a DCN at a border security checkpoint may always be searching for particular objects such as weapons, people on a watch-list, or drugs.

In block 704, the DCN receives search characteristics to identify an indication of an object or an event. The search characteristics can be part of a search request and can specify particular metadata or acquired data to be searched for, such as a particular facial geometry, license plate number, or vehicle color, to be identified. In some cases, the DCN may receive different search characteristics as part of different search requests from different devices on the network. For example, the DCN may receive first search characteristics from a first neighboring DCN to identify objects similar to a backpack, and receive second search characteristics from a second neighboring DCN to identify a particular facial geometry. Each of the first and second neighboring DCNs may be in a search state using their respective search characteristics, while the DCN receiving the search characteristics from the neighboring DCNs may be in a search state for both the first and second search characteristics.

In block 706, the DCN analyzes metadata to search at least one of the acquired data and the metadata to identify an indication of the object or the event. In some cases, this can include analyzing previously stored metadata or previously stored acquired data. In other cases, only the generated metadata or acquired data going forward is searched using the search characteristics to analyze metadata.

In searching the acquired data and/or the generated metadata, the DCN may perform a predetermined number of iterations of the search using slightly different search characteristics or may use a range for the search characteristics. For example, if no match is found, the DCN may repeat the search using an adjusted search characteristic such as a slightly larger size or a slightly different color.

In block 708, it is determined whether an indication of the object or event is identified. If not, the DCN checks whether an exit command is received in block 716 to exit the search state. If an exit command is received, the search process of FIG. 7 ends by returning to the idle state in block 718. If not, the process of FIG. 7 returns to block 706 to continue to search at least one of the acquired data and the metadata to identify an indication of the object or the event.

On the other hand, if it is determined in block 708 that an indication of the object or the event has been identified, the DCN in block 710 sends metadata and/or acquired data to another device or devices on the network. In one implementation, the DCN can send the acquired data indicating the object or the event to an NMPS and/or central controller 101. In other implementations, the DCN may only send the generated metadata indicating the object or the event.

In some cases, the device or devices receiving the metadata or acquired data from the DCN (e.g., an NMPS or central controller) may respond with a new search request based on the metadata and/or acquired data sent in block 710. For example, the DCN may send metadata to a NMPS in block 710 indicating that a particular object was identified such as a backpack. The NMPS may then respond to the DCN with a new search request for a particular facial geometry within a certain timeframe to associate the backpack with a person of interest.

In block 712, an alert may optionally be sent to one or more devices on the network. In one example, the DCN may send alerts to all neighboring DCNs indicating that the object or the event has been identified. In addition, a DCN may receive different alerts from different devices on the network. The DCN may also optionally initiate a chat with one or more other DCNs as discussed in more detail below with reference to FIGS. 8A and 8B.

Figure 8A:
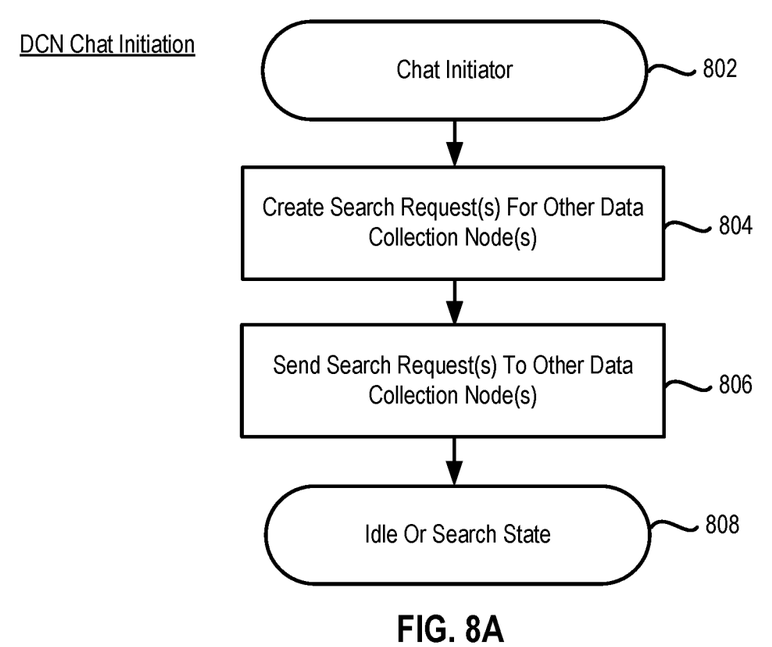
FIG. 8A is a flowchart for a chat initiator process of a DCN according to an embodiment.

FIG. 8A is a flowchart for a chat initiator process that can be performed by a DCN according to an embodiment. The chat initiation may begin as part of a search process or an alert at the DCN. By chatting among the DCNs, it is ordinarily possible for the DCNs to share information and improve the responsiveness of surveillance system 100. In other words, central controller 101 does not need to coordinate the processing and exchange of information among the DCNs operating in a chat state or mode.

In block 802, the DCN enters a chat initiation state and the DCN in block 804 creates one or more search requests for other DCNs. The search request or requests can be to search for acquired data or metadata indicating a particular object or event in the acquired data, such as a certain person or vehicle identified at the DCN initiating the chat. In some cases, the other DCNs can include all neighboring DCNs or DCNs in a direction that a vehicle was traveling, for example. In other cases, the other DCNs can include a subset of all DCNs in surveillance system 100, such as all DCNs along a certain mass transit line.

In block 806, the DCN sends the search request or requests to the other DCNs. The DCN then enters an idle or search state in block 808.

Figure 8B:
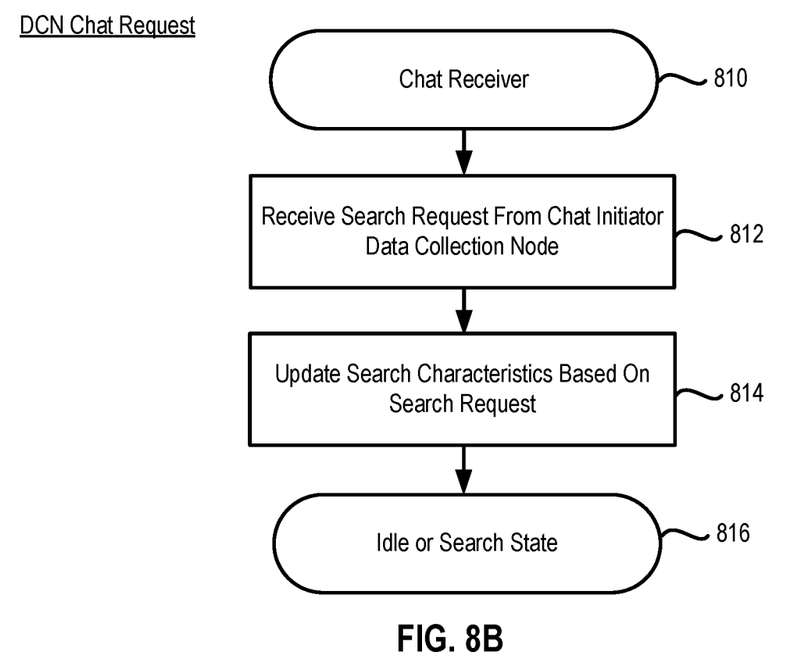
FIG. 8B is a flowchart for a chat receiver process of a DCN according to an embodiment.

FIG. 8B is a flowchart for a chat receiver process that is performed by a DCN receiving a search request from a chat initiator DCN according to an embodiment. In block 810, the DCN enters a chat receiver state, which may be in response to an initial chat request received from a chat initiator DCN. A DCN may also receive additional chat requests from different devices on the network. It is therefore possible for a DCN to be in a chat state with multiple other devices at the same time.

In block 812, the chat receiver DCN receives a search request from the chat initiator DCN. In block 814, the chat receiver DCN updates its search characteristics for analyzing metadata based on the received search request. This can include adding new search characteristics to existing search characteristics or setting the only search characteristics to be used at the chat receiver DCN. For example, an update to the search characteristics can include adding a new facial geometry to existing facial geometries identify a newly suspected person related to an event identified by the chat initiator DCN. As noted above, the search request may cause the chat receiver DCN to search previously acquired data or previously generated metadata stored in its memory for an indication of a particular object or event.

In other implementations, the search request may cause the chat receiver DCN to change a threshold for analysis of the metadata, such as an alert criterion, or to change the type of metadata being generated by the chat receiver DCN. For example, a chat receiver DCN may receive a search request to search its newly acquired data for an indication of a particular license plate number. The chat receiver DCN may then generate and analyze metadata indicating whether license plate numbers identified in its newly acquired data match the license plate number from the search request.

In block 816, the chat receiver process ends and the chat receiver DCN enters an idle or search state.

Figure 9:
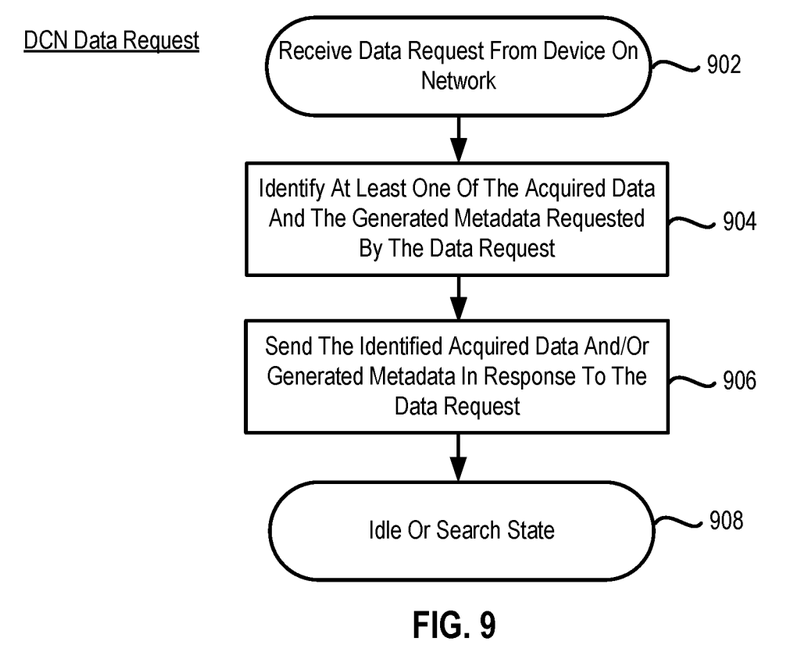
FIG. 9 is a flowchart for a data request process of a DCN according to an embodiment.

FIG. 9 is a flowchart for a data request process that can be performed by a DCN according to an embodiment. In block 902, the DCN receives a data request from another device on the network, such as another DCN, an NMPS, or central controller 101. In some implementations, the data request can come after an NMPS indicates to central controller 101 that metadata stored at the NMPS matches a search request from central controller 101. In another implementation, the data request can come after the DCN notifies an NMPS or central controller 101 of an alert or a match to a search request.

In block 904, the DCN analyzes metadata to identify at least one of the acquired data or the generated metadata identified by the data request received in block 902. The requested data and/or metadata can be identified in the data request by, for example, a window of time when the data was acquired or generated. In another example, the data and/or metadata can be identified as the data used to generate certain metadata stored at an NMPS and may also include a window of time for data acquired before and after the data used to generate the metadata stored at the NMPS.

In block 906, the DCN sends the identified data and/or metadata to a device on the network in response to the data request. In some implementations, the requested data and/or metadata can be sent to the device requesting the data. In other implementations, the requested data and/or metadata may be sent to a different device, such as where the DCN receives the data request from an NMPS, but sends the requested data to central controller 101.

In block 908, the data request process ends and the DCN enters an idle or search state.

Figure 10:
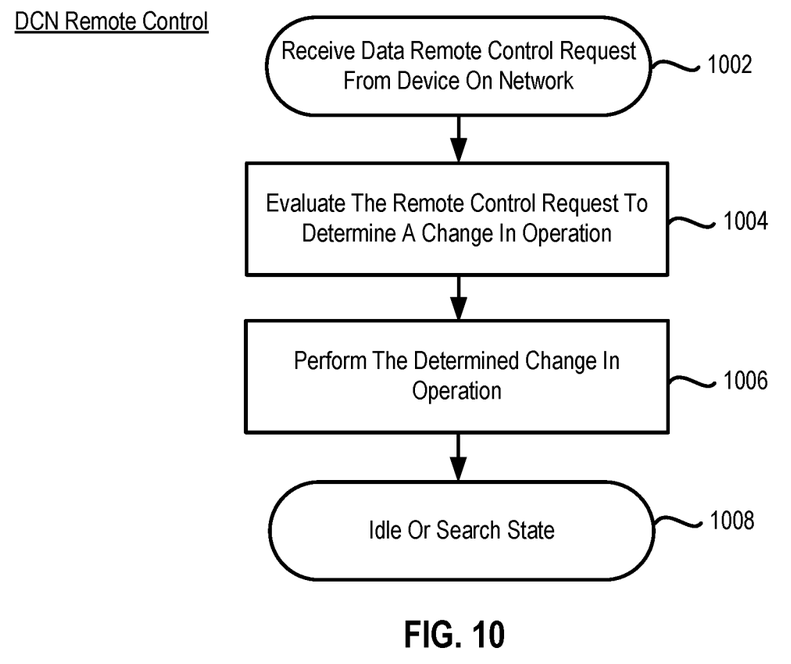
FIG. 10 is a flowchart for a remote control process of a DCN according to an embodiment.

FIG. 10 is a flowchart for a remote control process that can be performed by a DCN according to an embodiment. The remote control process can allow for another device on the network to control or change operation of the DCN.

In block 1002, the DCN receives a remote control request from a device on the network. The request may come from, for example, another DCN, NMPS, or central controller 101.

In block 1004, the DCN evaluates the remote control request to determine a change in operation of the DCN. In one example, the remote control request may include turning a camera or changing an image projected onto a scene captured by a camera. In another example, the remote control request may redirect the data acquired at the DCN to stream to another device on the network. Part of the evaluation of the remote control request can include a verification of the request using for example, a security key, to verify the authenticity of the control request.

In block 1006, the change in operation is performed by the DCN, and the process of FIG. 10 ends in block 1008 with the DCN entering an idle or search state.

Example NMPS Processes

Figure 11:
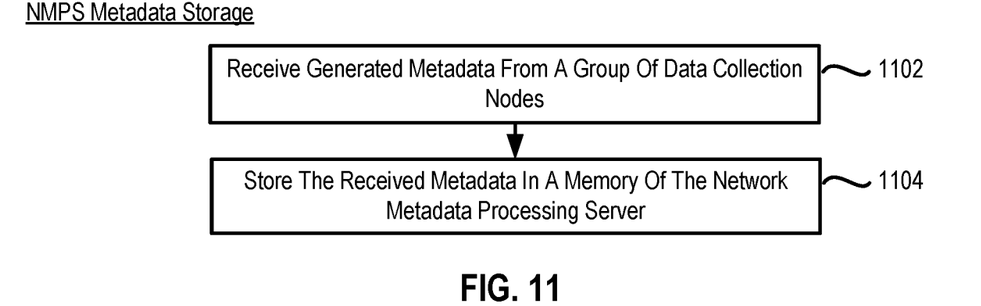
FIG. 11 is a flowchart for a metadata storage process of an NMPS according to an embodiment.

FIG. 11 is a flowchart for a metadata storage process that can be performed by an NMPS according to an embodiment. In block 1102, the NMPS receives metadata generated by a group of DCNs. The group of DCNs can be associated with the NMPS based on geographic location, as in the example of NMPS 108 in FIG. 2. In other examples, the group of DCNs can be associated with the NMPS based on a different criterion, such as being located along a particular freeway or mass transit route. The metadata may be received periodically without a request from the NMPS or may be received in response to a request sent from the NMPS.

In block 1104, the NMPS stores the received metadata in a memory of the NMPS (e.g., memory 148 of NMPS 108 in FIG. 3). In some implementations, the metadata may be stored in the memory of the NMPS without modifying the metadata. In other implementations, the metadata may be modified such as by adding an indication of which DCN in the group generated the metadata or a time when the metadata was received by the NMPS.

As noted above, storing the metadata at an intermediate location such as an NMPS can allow for a more efficient search of the data in surveillance system 100 for an object or event of interest. Without an NMPS, each DCN may need to be accessed by central controller 101 to obtain metadata or analyze acquired data.

Figure 12:
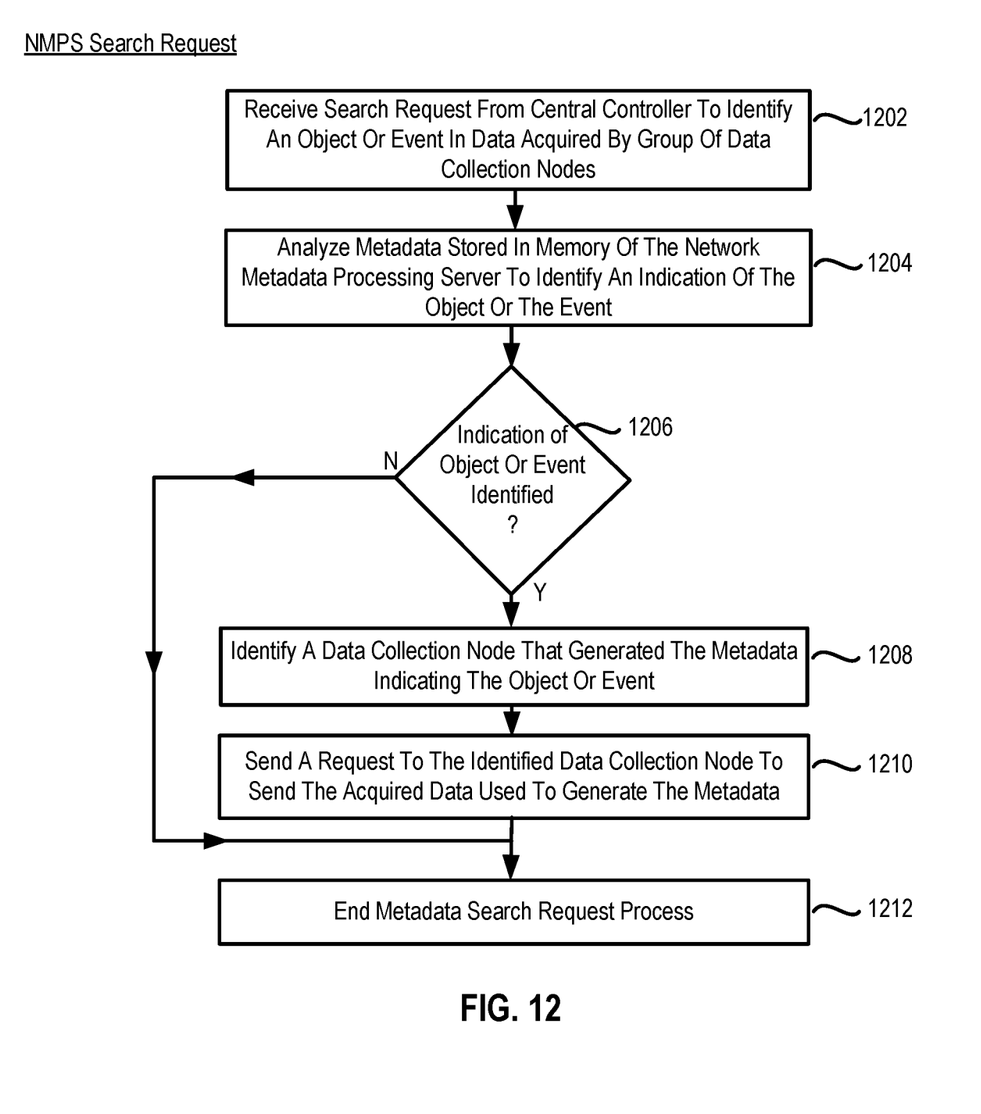
FIG. 12 is a flowchart for a metadata search request process of an NMPS according to an embodiment.

FIG. 12 is a flowchart for a metadata search request process of an NMPS according to an embodiment. In block 1202, the NMPS receives a search request from central controller 101 to identify an object or event indicated in the data acquired by a group of DCNs associated with the NMPS. The search request may be in response to the identification of an object, person, or event indicated in data acquired in a different or neighboring group of DCNs, or in response to a system-wide search for an object or event.

In block 1204, the NMPS analyzes the metadata stored in its memory to identify an indication of the object or event. This can include, for example, searching for an indication of a facial geometry, license plate number, or vehicle model and color specified in the search request. In analyzing the metadata, the NMPS may perform a predetermined number of iterations of the analysis using slightly different search characteristics or may use a range for the search characteristics. For example, if no match is found, the NMPS may repeat the analysis using an adjusted search characteristic such as a slightly larger size or a slightly different color.

In block 1206, the NMPS determines whether an indication of the object or event was identified when analyzing the metadata. If not, the metadata search request process ends in block 1212, which may include sending a notification to central controller 101 that no indication of the object or event was identified in the analysis.

If an indication of the object or event was identified in the metadata, the NMPS in block 1208 identifies a DCN in the group of DCNs that generated the metadata indicating the object or event. The metadata stored in the memory of the NMPS can include an indication of which DCN generated the metadata.

In block 1210, the NMPS sends a request to the identified DCN to send the acquired data used to generate the metadata indicating the object or the event to at least one of the NMPS and central controller 101. This request may serve as a data request as discussed above with reference to FIG. 9. In some implementations, the NMPS may also send a request for further processing of the acquired data or metadata by the DCN. The data sent back by the DCN can then be passed on to central controller 101 for further analysis if it is only sent to the NMPS. In other implementations, the requested data can be sent directly from the DCN to central controller 101 for further analysis.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a DSP, an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data collection node in a network of data collection nodes, the data collection node comprising:
    at least one sensing device configured to acquire data;
    a memory for storing the acquired data; and
    a processor configured to:
        generate metadata using the acquired data;
        analyze the metadata;
        send at least one of the metadata, the acquired data, and an alert to another device on the network based on the analysis of the metadata;
        create a search request for one or more other data collection nodes on the network to change a type of metadata generated by the one or more other data collection nodes that is associated with data acquired by a respective sensing device of each data collection node of the one or more other data collection nodes; and
        send the search request to the one or more other data collection nodes; and
    wherein the processor, the memory, and the at least one sensing device of the data collection node are combined into a single device.

2. The data collection node of claim 1, wherein the generated metadata indicates an electromagnetic characteristic of an object represented in the acquired data.

3. The data collection node of claim 1, wherein the generated metadata indicates at least one of a shape and a size of an object represented in the acquired data.

4. The data collection node of claim 3, wherein in generating metadata indicating at least one of the shape and the size of the object, the processor is further configured to use the acquired data to identify an image projected onto the object.

5. The data collection node of claim 1, wherein the generated metadata indicates an alphanumeric character represented in the acquired data.

6. The data collection node of claim 1, wherein the generated metadata is used to render a three dimensional image.

7. The data collection node of claim 1, wherein the generated metadata indicates a facial geometry for facial recognition.

8. The data collection node of claim 1, wherein in generating the metadata, the processor is further configured to determine whether an infrared heat level or a change in a brightness level of the acquired data meets or exceeds a threshold level.

9. The data collection node of claim 1, wherein the generated metadata indicates at least one of a velocity, an acceleration, and a direction of an object represented in the acquired data.

10. The data collection node of claim 1, wherein the generated metadata indicates at least one of a time when the acquired data was acquired and a location of the data collection node.

11. The data collection node of claim 1, wherein the acquired data includes video data, and in generating the metadata, the processor is further configured to sample the video data at a lower frame rate.

12. The data collection node of claim 1, wherein the processor is further configured to:
    receive a data request from a device on the network outside the data collection node requesting at least one of acquired data and generated metadata;
    identify the at least one of the acquired data and the generated metadata requested by the data request; and
    send the at least one of the acquired data and the generated metadata requested by the data request to one or more devices on the network in response to the data request.

13. The data collection node of claim 1, wherein the processor is further configured to:
    receive a remote control request from a device on the network outside the data collection node to remotely change the operation of the data collection node;
    evaluate the remote control request to determine a change in the operation of the data collection node; and
    perform the determined change in the operation of the data collection node in response to the control request.

14. The data collection node of claim 1, wherein the processor is further configured to:
    compare the generated metadata to an alert criterion; and
    send an alert to one or more devices on the network if the generated metadata meets the alert criterion.

15. The data collection node of claim 1, wherein the search request further causes the one or more other data collection nodes on the network to identify an object or an event in data acquired by the one or more other data collection nodes.

16. A method for operating a data collection node in a network of data collection nodes, the method comprising:
   acquiring data using at least one sensing device of the data collection node;
   storing the acquired data in a memory of the data collection node;
   generating metadata at the data collection node based on the acquired data;
   analyzing the metadata at the data collection node using a processor of the data collection node;
   sending at least one of the metadata, the acquired data, and an alert from the data collection node to another device on the network based on the analysis of the metadata;
   creating a search request for one or more other data collection nodes on the network to change a type of metadata generated by the one or more other data collection nodes that is associated with data acquired by a respective sensing device of each data collection node of the one or more other data collection nodes; and
   sending the search request to the one or more other data collection nodes; and
   wherein the processor, the memory, and the at least one sensing device of the data collection node are combined into a single device.

17. The method of claim 16, wherein the generated metadata indicates an electromagnetic characteristic of an object represented in the acquired data.

18. The method of claim 16, wherein the generated metadata indicates at least one of a shape and a size of an object represented in the acquired data.

19. The method of claim 18, wherein in generating metadata indicating at least one of the shape and the size of the object, the method further comprises using the acquired data to identify an image projected onto the object.

20. The method of claim 16, wherein the generated metadata indicates an alphanumeric character represented in the acquired data.

21. The method of claim 16, wherein the generated metadata is used to render a three dimensional image.

22. The method of claim 16, wherein the generated metadata indicates a facial geometry for facial recognition.

23. The method of claim 16, wherein in generating the metadata, the method further comprises determining whether an infrared heat level or a change in a brightness level of the acquired data meets or exceeds a threshold level.

24. The method of claim 16, wherein the generated metadata indicates at least one of a velocity, an acceleration, and a direction of an object represented in the acquired data.

25. The method of claim 16, wherein the generated metadata indicates at least one of a time when the acquired data was acquired and a location of the data collection node.

26. The method of claim 16, wherein the acquired data includes video data, and in generating the metadata, the method further comprises sampling the video data at a lower frame rate.

27. The method of claim 16, further comprising:
   receiving a data request from a device on the network outside the data collection node requesting at least one of acquired data and generated metadata;
   identifying the at least one of the acquired data and the generated metadata requested by the data request; and
   sending the at least one of the acquired data and the generated metadata requested by the data request to one or more devices on the network in response to the data request.

28. The method of claim 16, further comprising:
   receiving a remote control request from a device on the network outside the data collection node to remotely change the operation of the data collection node;
   evaluating the remote control request to determine a change in the operation of the data collection node; and
   performing the determined change in the operation of the data collection node in response to the control request.

29. The method of claim 16, further comprising:
   comparing the generated metadata to an alert criterion; and
   sending an alert to one or more devices on the network if the generated metadata meets the alert criterion.

30. The method of claim 16, wherein the search request further causes the one or more other data collection nodes on the network to identify an object or an event in data acquired by the one or more other data collection nodes.

31. A surveillance system for analyzing data, the surveillance system comprising:
   a central controller; and
   a plurality of data collection nodes in communication with the central controller via a network, wherein each data collection node of the plurality of data collection nodes is configured to:
      acquire data using at least one sensing device of the data collection node;
      store the acquired data in a memory of the data collection node;
      generate metadata using the acquired data;
      analyze the metadata using a processor of the data collection node;
      send at least one of the metadata, the acquired data, and an alert from the data collection node to another device on the network based on the analysis of the metadata;
      create a search request for one or more other data collection nodes on the network to change a type of metadata generated by the one or more other data collection nodes that is associated with data acquired by a respective sensing device of each data collection node of the one or more other data collection nodes; and
      send the new search request to the one or more other data collection nodes; and
   wherein the processor, the memory, and the at least one sensing device of the data collection node are combined into a single device.

32. The surveillance system of claim 31, further comprising at least one Network Metadata Processing Server (NMPS) in communication with the central controller via the network, wherein the at least one NMPS is configured to:
   receive generated metadata from a group of data collection nodes of the plurality of data collection nodes; and
   store the received metadata in a memory of the NMPS.

33. The surveillance system of claim 32, wherein the NMPS is further configured to:
   receive a search request from the central controller to identify an object or an event in the data acquired by the group of data collection nodes; and
   analyze the metadata stored in the memory of the NMPS to identify an indication of the object or the event.

34. The surveillance system of claim 33, wherein the NMPS is further configured to:
- identify a data collection node that generated metadata indicating the object or the event; and
- send a request to the identified data collection node to send the acquired data used to generate the metadata indicating the object or the event to at least one of the NMPS and the central controller.

35. The surveillance system of claim 31, wherein the central controller is further configured to send a search request to at least one data collection node of the plurality of data collection nodes to identify an object or an event in the data acquired by the at least one data collection node, and wherein the at least one data collection node is further configured to analyze the generated metadata to search for an indication of the object or the event in the data acquired by the at least one data collection node.

* * * * *